United States Patent [19]

Harward

[11] Patent Number: 4,928,181
[45] Date of Patent: May 22, 1990

[54] METHODS AND APPARATUS FOR OPTICALLY ENHANCING SELECTED FEATURES IN AN INPUT IMAGE

[75] Inventor: Charles N. Harward, Midlothian, Va.

[73] Assignee: Philip Morris Incorporated, New York, N.Y.

[21] Appl. No.: 274,029

[22] Filed: Nov. 21, 1988

[51] Int. Cl.$^5$ ............................................. H04N 5/66
[52] U.S. Cl. .................................. 358/230; 350/334; 350/337
[58] Field of Search ............... 350/340, 341, 334, 337; 358/230

[56] References Cited

U.S. PATENT DOCUMENTS

| | | | |
|---|---|---|---|
| 3,930,719 | 1/1976 | Madrid et al. | 350/336 |
| 4,459,615 | 7/1984 | Mir | 358/236 |
| 4,653,861 | 3/1987 | Keindo et al. | 350/337 |
| 4,743,097 | 5/1988 | Johnson et al. | 350/337 |

OTHER PUBLICATIONS

Hua-Kuang Liu et al., "On the Progress of the Liquid Crystal Television Spatial Light Modulator," Jet Propulsion Laboratory, Calif. Inst. Tech., Pasadena, CA 91109.

Tien-Hsin Chao et al., "Real Time Optical Edge Enhancement Using a Hughes Liquid Crystal Light Valve", J.P.L., Calif Inst. Tech., Pasadena, CA 91109.

D. Armitage et al., "Photoaddressed Liquid-Crystal Spatial Light Modulators", Research & Development Div., Lockheed Missiles & Space Co., 3251 Hanover Street, Palo Alto, Calif., 94304.

K. D. Hughes et al., "Optical Preprocessing Using Liquid Crystal Televisions", *Applied Optics*, vol. 26, No. 6, Mar. 15, 1987, pp. 1042–1044.

Primary Examiner—John K. Peng
Attorney, Agent, or Firm—Robert R. Jackson

[57] ABSTRACT

Input image features of predetermined brightness are enhanced in an output image by processing the input image using a liquid crystal display in conjunction with specially oriented light polarizing devices.

14 Claims, 4 Drawing Sheets

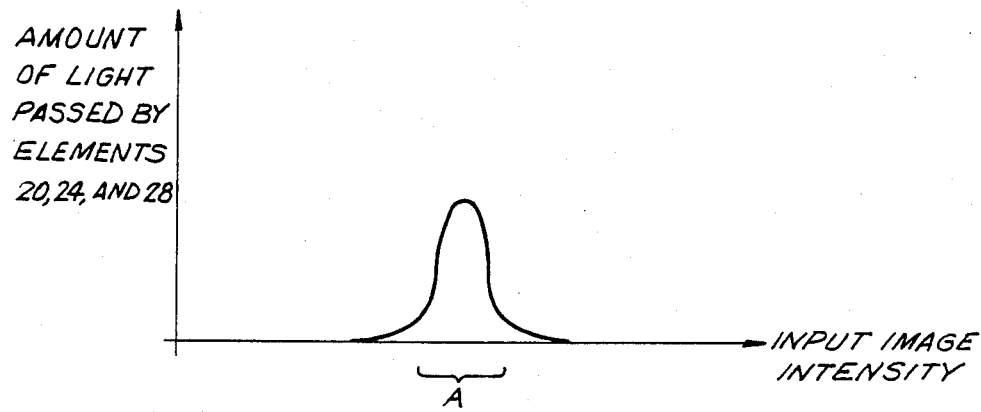
FIG. 3
FIG. 4
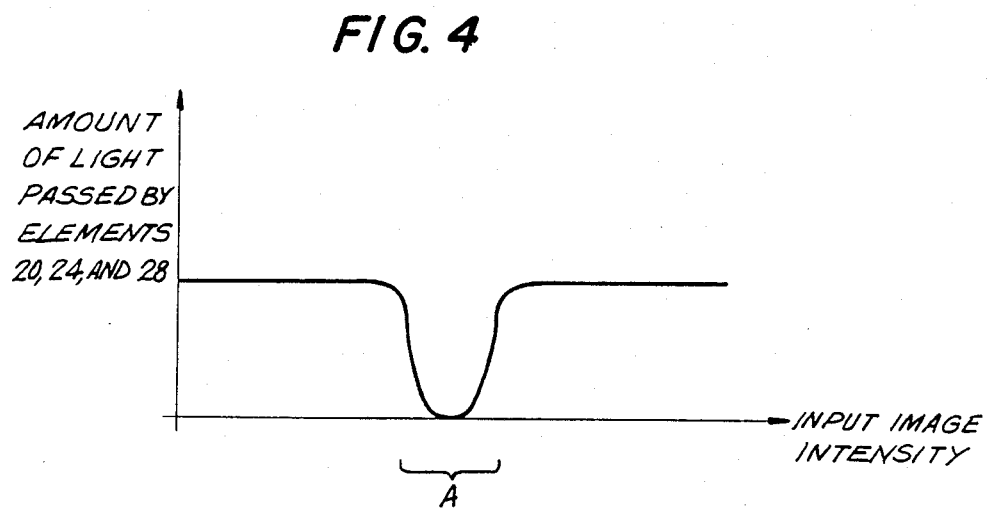

METHODS AND APPARATUS FOR OPTICALLY ENHANCING SELECTED FEATURES IN AN INPUT IMAGE

BACKGROUND OF THE INVENTION

This invention relates to image processing methods and apparatus, and more particularly to methods and apparatus for producing an output image in which certain features in an input image stand out or are more readily differentiated from the remainder of the input image.

As is discussed, for example, in commonly assigned, Casasent U.S. Pat. No. 4,906,099 (which is hereby incorporated by reference herein), optical image processing offers many advantages in such applications as high-speed optical product inspection. The methods and apparatus employed in the above-mentioned Casasent patent application process a two-dimensional input image, for example, by focusing all of the input image information down to a line or one-dimensional output image. This causes any bright line in the input image which is perpendicular to the longitudinal axis of the output image to appear as a very bright spot in the output image. The presence or absence, location, and/or intensity of this bright spot in the output image can be used to detect such properties of the input image bright line as its presence or absence, proper alignment perpendicular to the output image axis, location, brightness, etc.

Quite often in using techniques of the type described above, it will be desired to test a line which is no brighter than an adjacent area, or a line which is less bright than an adjacent area. For example, it may be desired to locate the edges of a surface of a rectangular product. Such edges often tend to reflect light less strongly than the remainder of the surface because the exterior of the product is bent or folded at the edges. As another example, it may be desired to test the edges of some of the bolder lettering or other ornamentation on the surface of the product, but such edges are very often defined by transitions from bright to dark portions of the image rather than by bright lines.

From the foregoing it will be apparent that it would be desirable to be able to enhance certain features of an input image to facilitate subsequent inspection or other processing of the image with respect to those features.

It is therefore an object of this invention to provide methods and apparatus for optically enhancing selected features of an input image.

It is a more particular object of this invention to provide methods and apparatus for filtering an input image so that portions of the image having a particular light level (which may be, for example, an intermediate light level) are passed (or alternatively attenuated) by the apparatus, while other portions having other light levels are attenuated (or alternatively passed) by the apparatus.

SUMMARY OF THE INVENTION

These and other objects of the invention are accomplished in accordance with the principles of the invention by converting the input image to a representation (display) on a liquid crystal display ("LCD") or liquid crystal television ("LCTV") screen, which may be conventional. (For convenience herein, LCDs and LCTVs will be referred to generically as LCDs.) The LCD screen is illuminated with polarized light having a polarization axis which is rotated about the optical axis of the LCD from the conventional input light polarization axis. The input light transmitted by the LCD display is passed through an output polarizer having a polarization axis which is also rotated about the optical axis of the LCD from the conventional output light polarization axis. The output light polarization axis is typically either approximately perpendicular to the input light polarization axis (for positive enhancement) or approximately parallel to the input light polarization axis (for negative enhancement). The output polarizer tends to pass light more readily from the portions of the LCD screen having substantially a particular brightness level (in the case of positive enhancement) or to more strongly suppress light from such portions of the LCD screen (in the case of negative enhancement). By controlling such variables as the overall brightness of the input image and/or the brightness of the image on the LCD screen, particular portions of the input image can be selected for enhancement.

Further features of the invention, its nature and various advantages will be more apparent from the accompanying drawings and the following detailed description of the preferred embodiments.

BRIEF DESCRIPTION OF THE DRAWINGS

FIG. 3 is a diagram of one possible (positive) image enhancement characteristic of the systems of this invention.

FIG. 4 is a diagram of another possible (negative) image enhancement characteristic of the systems of this invention.

DETAILED DESCRIPTION OF THE PREFERRED EMBODIMENTS

Figure 1:
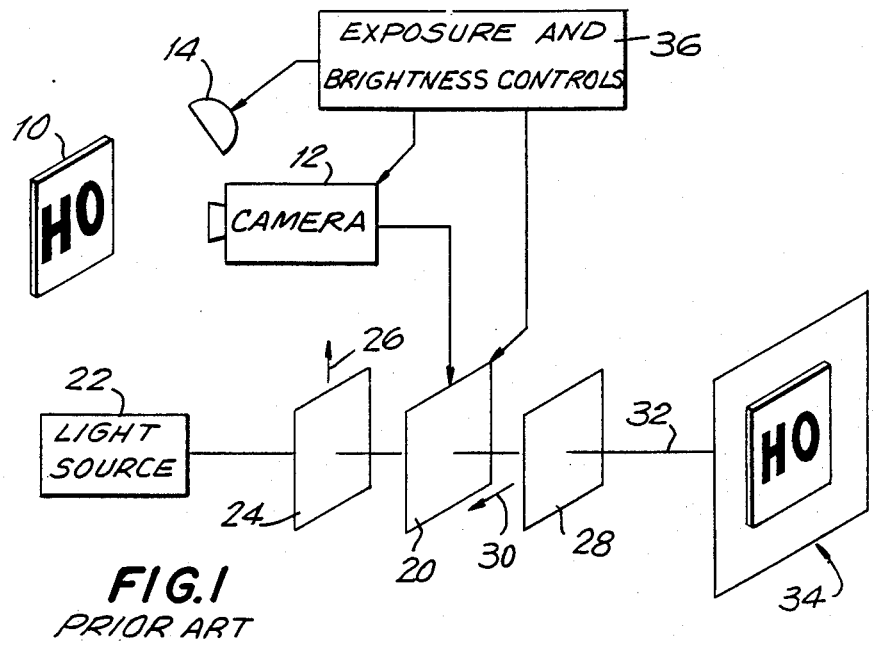
FIG. 1 is a simplified block diagram of a conventional LCD image processing system.

A typical prior art imaging system employing an LCD screen 20 is shown in FIG. 1. Input image 10 (e.g., a surface of a product to be optically inspected) is illuminated by light from conventional light source 14 and "photographed" by conventional video camera 12. The output signal of camera 12 (after conversion to a form suitable for use in driving an LCD) is applied to conventional LCD screen 20. Although the inventor hereof is not an expert in the construction and operation of LCD's, as he understands it an LCD typically includes two parallel, laterally spaced, substantially transparent plates with liquid crystal molecules sandwiched therebetween. One of the plates is etched or rubbed parallel to one axis (e.g., a horizontal axis), while the other plate is etched or rubbed parallel to another axis (e.g., a vertical axis) so that the liquid crystal molecule structures tend to be twisted from one plate to the other. Each plate also carries an electrode grid (x-y coordinate) structure so that a voltage can be applied across the liquid crystal molecule structure on a pixel-by-pixel basis. The voltage applied to each pixel in this manner is determined by the corresponding portion of the output signal of camera 12 and the bias voltage control on the LCD. An example of an LCD of this type is the model ET-10 liquid crystal television available from Epson America, Inc., of Torrance, Calif. 90505. (For more information on LCTVs, see Hua-Kuang Liu et al., "On the Progress of the Liquid Crystal Television Spatial Light Modulator", presented at the Spatial Light Modulator conference of the Optical Society of America at South Lake Tahoe, Nev., June 15–17, 1988, which is hereby incorporated by reference herein.)

One side of LCD 20 is illuminated by light from light source 22 after passage through input light polarizer 24. As indicated by arrow 26, the polarization axis of input polarizer 24 is typically aligned with an edge of LCD 20 (e.g., polarization axis 26 is typically either vertical or horizontal). This is true, for example of the above-mentioned Epson product. (Of course, input polarizer 24 can be eliminated if light source 22 produces properly oriented polarized light.) LCD 20 tends to rotate the polarization axis of the light applied to each pixel by an amount inversely proportional to the voltage applied to that pixel. In particular, LCD 20 rotates the polarization axis of the light applied to a pixel having little or no applied voltage by approximately 90°. As the applied voltage increases, the amount by which the polarization rotates decreases.

The light exiting from LCD 20 is applied to output light polarizer 28, whose polarization axis 30 is typically perpendicular to input light polarization axis 26. Again, this is true, for example, of the above-mentioned Epson product. Accordingly, light whose polarization axis has been rotated approximately 90° by LCD 20 is substantially passed by output polarizer 28, while light whose polarization axis has been rotated substantially more or less than 90° will be substantially attenuated. (Note that in comparing this description of conventional commercially available LCDs (e.g., the above-mentioned Epson product) with what is shown in FIG. 1 of the above-mentioned Liu et al. article, there is always some bias voltage when the commercially available devices are on. The commercially available devices therefore tend to transmit light when they are on, with the video camera output signal being superimposed on the bias voltage to locally increase or reduce that voltage and thereby locally reduce or increase the amount of light transmitted.) Because the amount of transmitted light polarization axis rotation is determined by the strength of the applied voltage, the light passed by output polarizer 28 is a faithful reproduction 34 of input image 10. (A negative output image could be produced by making polarization axes 26 and 30 substantially perpendicular to one another.) Conventional exposure and brightness controls 36 can be used to control such system variables as the intensity of illumination of input image 10, the sensitivity of camera 12, and/or the "brightness" (bias voltage) of LCD 20.

As has been mentioned, in the conventional systems described above, polarization axes 26 and 30 are believed to be either parallel or perpendicular to the axes along which the plates comprising LCD 20 are etched or rubbed as part of their fabrication. In any event, in products like the above-mentioned Epson ET-10, polarization axes 26 and 30 are known to be substantially parallel or perpendicular to the peripheral edges of LCD 20.

In attempting to use apparatus of the type shown in the above-mentioned Casasent patent to inspect or otherwise analyze images of the type shown in FIG. 1, it may be desired, for example, to establish that the letter H in that image is truly vertical and/or that the left-hand edge of that letter is a certain distance from the left-hand edge of the image. However, as in the images shown in FIG. 1, it frequently happens that the image features to be examined are part of much larger features (e.g., the broad lettering linework and the fairly broad product edge regions) and therefore cannot be examined in isolation with the precision required. For example, the letter H may be tilted by an amount which is less than the width of the lettering linework but which is still nevertheless unacceptable. This defect might be difficult to detect with the apparatus shown in the Casasent application unless it were possible to examine the edges of the lettering in isolation from the remainder of the lettering. The subject matter of this invention makes this possible as will now be explained.

Figure 2:
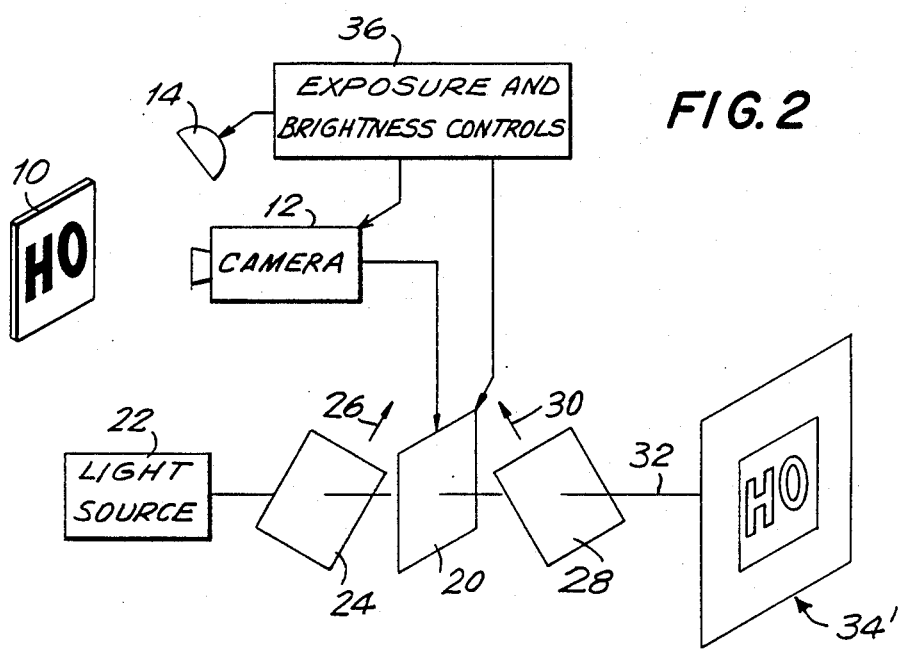
FIG. 2 is a view similar to FIG. 1 showing how the system of FIG. 1 can be modified in accordance with the principles of this invention.

The inventor hereof has discovered that if polarization axes 26 and 30 are rotated about optical axis 32 as shown, for example, in FIG. 2, the optical system including elements 20, 24, and 28 takes on a light-transmitting characteristic like that shown in FIG. 3. In particular, elements 20, 24, and 28 pass light substantially only at pixels associated with portions of input image 10 having brightness in a relatively narrow range A in FIG. 3. (If polarizer 28 were rotated so that polarization axis 30 was more nearly parallel to polarization axis 26, or if polarizer 24 were rotated so that axis 26 was more nearly parallel to axis 30, the optical system including elements 20, 24, and 28 would take on a light-transmitting characteristic like that shown in FIG. 4, which is a negative of the FIG. 3 characteristic. In particular, in that case elements 20, 24, and 28 tend to substantially attenuate light transmitted by LCD pixels associated with portions of input image 10 having brightness in a relatively narrow range A in FIG. 4, while passing light from all other LCD pixels.)

These phenomena can be used in accordance with this invention to pick out certain features in the input image for inclusion in output image 34', while other input image features are effectively omitted from the output image. For example, as shown in FIG. 2, conventional exposure and brightness controls 36 are used to control the amount of illumination of input image 10 via light source 14, the sensitivity of camera 12, and/or the "brightness" (bias voltage) of LCD 20 so that pixels associated with the edges of the lettering in the input image have the net or average brightness (region A in FIG. 3) required to cause light from light source 22 to pass through elements 20, 24, and 28 at those pixels. Other adjacent brighter pixels (the pure background pixels) or less bright pixels (the pure lettering linework pixels) have brightness outside region A in FIG. 3 so that elements 20, 24, and 28 do not pass light at those pixels. The result is an output image 34' like that shown in FIG. 2 (or perhaps more accurately a negative of that image). In particular, only the edges of the letters appear in output image 34'. This is so because the pixels associated with the edge of the letters tend to be partly background and partly lettering and therefore have brightness intermediate the pure background or pure lettering pixels. These pixels of intermediate net brightness are selected by the filtering function represented by FIG. 3. The edges of the letters are thereby "enhanced" in output image 34'. Output image 34' can then be readily processed using techniques like those shown, for example, in the above-mentioned Casasent Patent to provide much more precise analysis of the input image on the basis of very fine details like the edges of input image features or transitions between adjacent input image features. As shown in FIG. 2, input image edges can also be enhanced and better defined in the manner described above for the same reasons described above.

Figure 5:
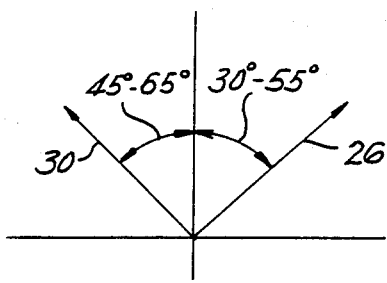
FIGS. 5–12 are diagrams illustrating polarization axis directions in accordance with the principles of this invention.
Figure 6:
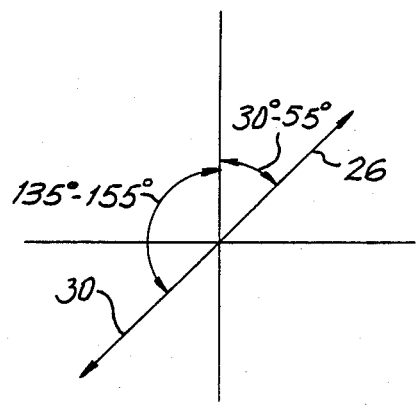
Figure 7:
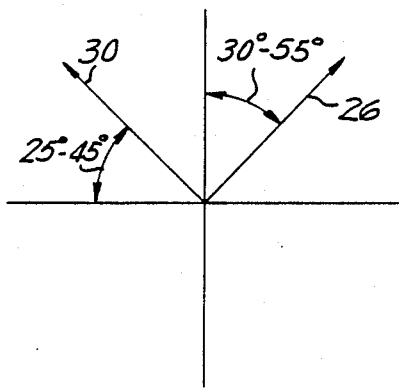
Figure 8:
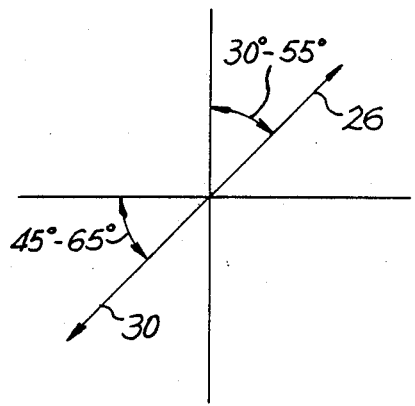
Figure 9:
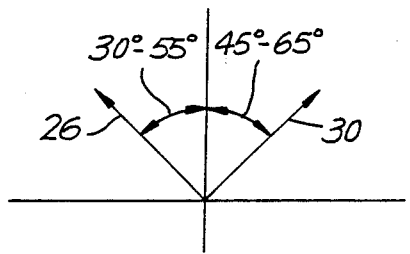
Figure 10:
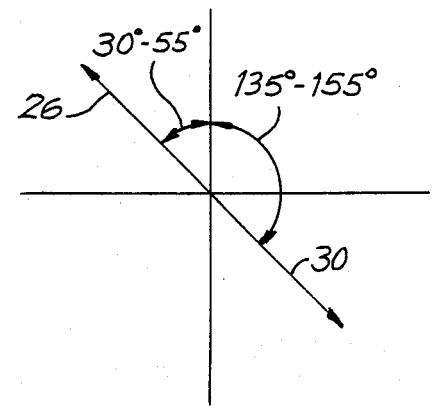
Figure 11:
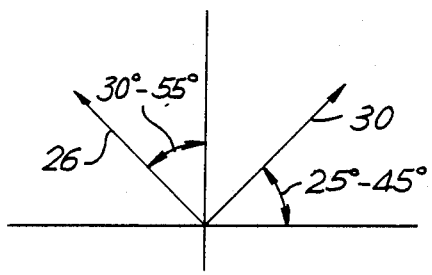
Figure 12:
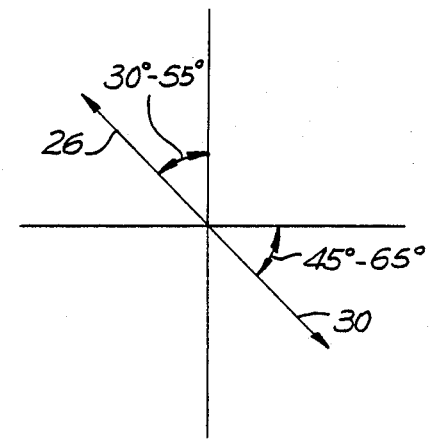

There is some variability in the amount by which polarization axes 26 and 30 can be rotated about optical axis 32 in accordance with this invention. It has been found that axis 26 can be rotated from about 30° to about 55° measured clockwise from the vertical edge of the LCD screen. (The clockwise direction is established by viewing the LCD in the same direction that light passes through it.) Axis 30 can be positioned from about 45° to about 65° counterclockwise from the vertical edge of the LCD screen for positive enhancement, or 90° from these angles for negative enhancement. (The counter-clockwise direction is again established by viewing the LCD in the same direction as light passes through it.) FIG. 5 illustrates the rotated positions of the input and output axes for positive enhancement, while FIG. 6 illustrates the positions of those axes for negative enhancement. (Note that in FIG. 6 axis 30 is shown pointing away from axis 26 for clarity, but that is the same as an oppositely directed arrow 30.) FIGS. 7 and 8 respectively show the output polarization axis 30 angles of FIGS. 5 and 6 related to the horizontal rather than the vertical edge of the LCD screen. Accordingly, the angle of rotation of axis 30 is from about 25° to about 45° clockwise in FIG. 7 and from about 45° to about 65° counter-clockwise in FIG. 8. The amount of rotation of input axis 26 tends to affect the range of the output axis angles that produce enhancement and the shape of the curves in FIGS. 3 and 4. For example, input axis rotation of about 45° tends to give the widest range of usable output axis rotation angles and, combined with an output axis angle of about 52° in FIG. 5 (or 38° in FIG. 7), tends to give the sharpest peak in FIG. 3. The sharpest valley in FIG. 4 tends to result from input axis rotation of about 45° and an output axis angle of about 142° in FIG. 6 (or 38° in FIG. 8). Note that axes 26 and 30 are preferably either substantially perpendicular to one another (for positive image enhancement as suggested by FIG. 3), or substantially parallel to one another (for negative image enhancement as suggested by FIG. 4).

Although for clarity and simplicity in the preceding paragraph (and in FIGS. 5-8) particular directions of rotation (clockwise or counter-clockwise) of axes 26 and 30 are assumed, axis 26 can alternatively be rotated in the opposite direction by the amounts specified above for rotation of that axis, and axis 30 can alternatively be concurrently rotated in the opposite direction by the amounts specified above for rotation of that axis. This is shown by FIGS. 9-12, which are respectively the counterparts of FIGS. 5-8 when each of axes 26 and 30 is rotated oppositely from what is shown in the corresponding one of FIGS. 5-8.

It will be understood that the foregoing is merely illustrative of the principles of this invention, and that various modifications can be made by those skilled in the art without departing from the scope and spirit of the invention. For example, input polarizer 26 can be omitted in FIG. 2 if light source 22 is a properly oriented polarized light source.

I claim:

1. The method of producing an optical output image in which selected portions of an input image are optically enhanced in said output image relative to other portions of said input image, said selected portions having a predetermined brightness in said input image which is substantially different from the brightness of the portions of said input image which are not to be enhanced, said method comprising the steps of:
   forming a representation of said input image on a liquid crystal display which is normally illuminated by polarized light having a first predetermined polarization axis perpendicular to the optical axis of said display, and which normally has an associated transmitted light polarizer having a second predetermined polarization axis perpendicular to said optical axis for polarizing the light transmitted by said display;
   illuminating said display with polarized light having a third predetermined polarization axis which is rotated by a first predetermined angle about said optical axis from said first predetermined polarization axis;
   passing the light transmitted by said display through a polarizer having a fourth predetermined polarization axis which is rotated by a second predetermined angle about said optical axis from said second polarization axis to produce said output image; and
   adjusting said representation so that said selected portions of said input image are optically enhanced in said output image relative to other portions of said input image;
   wherein said first predetermined angle is in the range from about 30° to about 55°, and wherein said second predetermined angle is in the range from about 45° to about 65°, and has a direction of rotation which is opposite the direction of rotation of said first predetermined angle for negative enhancement.

2. The method defined in claim 1 wherein said fourth polarization axis is substantially parallel to said third polarization axis for negative enhancement.

3. The method defined in claim 1 wherein said first predetermined angle is approximately 45°.

4. The method defined in claim 1 wherein said selected portions of said input image are optically enhanced in said output image by being made darker than all other portions of said output image.

5. The method defined in claim 1 wherein said step of adjusting said representation comprises the step of adjusting the overall brightness of said input image.

6. The method defined in claim 1 wherein said step of adjusting said representation comprises the step of adjusting the bias voltage on said liquid crystal display.

7. The method defined in claim 1 wherein said predetermined brightness is greater than the brightness of some of the portions of said input image which are not to be enhanced, but less than the brightness of some other portions of said input image which are not to be enhanced.

8. Apparatus for producing an optical output image in which selected portions of an input image are optically enhanced in said output image relative to other portions of said input image, said selected portions having a predetermined brightness in said input image which is substantially different from the brightness of the portions of said input image which are not to be enhanced, said apparatus comprising:
   a liquid crystal display of the type which is normally illuminated by polarized light having a first predetermined polarization axis perpendicular to the optical axis of said display, and which normally has an associated transmitted light polarizer having a second predetermined polarization axis perpendicular to said optical axis for polarizing the light transmitted by said display;

means for causing said liquid crystal display to form a representation of said input image;

means for illuminating said display with polarized light having a third predetermined polarization axis which is rotated by a first predetermined angle about said optical axis from said first predetermined polarization axis;

means for polarizing the light transmitted by said display to produce said output image, said means for polarizing having a fourth predetermined polarization axis which is rotated by a second predetermined angle about said optical axis from said second polarization axis; and means for adjusting said representation so that said selected portions of said input image are optically enhanced in said output image relative to other portions of said input image;

wherein said first predetermined angle is in the range from about 30° to about 55°, and wherein said second predetermined angle is in the range from about 45° to about 65°, and has a direction of rotation which is opposite the direction of rotation of said first predetermined angle for negative enhancement.

9. The apparatus defined in claim 8 wherein said fourth polarization axis is substantially parallel to said third polarization axis.

10. The apparatus defined in claim 8 wherein said first predetermined angle is approximately 45°.

11. The apparatus defined in claim 8 wherein said selected portions of said input image are optically enhanced in said output image by being made darker than all other portions of said output image.

12. The apparatus defined in claim 8 wherein said means for adjusting said representation comprises means for adjusting the overall brightness of said input image.

13. The apparatus defined in claim 8 wherein said means for adjusting said representation comprises means for adjusting the bias voltage on said liquid crystal display.

14. The apparatus defined in claim 8 wherein said predetermined brightness is greater than the brightness of some of the portions of said input image which are not to be enhanced, but less than the brightness of some other portions of said input image which are not to be enhanced.

* * * * *